United States Patent
Tremblay

(12) 
(10) Patent No.: US 6,592,652 B2
(45) Date of Patent: Jul. 15, 2003

(54) EXHAUST GAS TREATING DEVICE AND METHOD

(76) Inventor: Rosaire Tremblay, 1026 rue Montmagny, Chicoutimi Québec (CA), G7J 2Y1

(*) Notice: Subject to any disclaimer, the term of this patent is extended or adjusted under 35 U.S.C. 154(b) by 0 days.

(21) Appl. No.: 10/082,565

(22) Filed: Oct. 19, 2001

(65) Prior Publication Data

US 2002/0121192 A1 Sep. 5, 2002

(30) Foreign Application Priority Data

Oct. 19, 2000 (CA) ............................................. 2323980

(51) Int. Cl.[7] .............................................. B01D 53/04
(52) U.S. Cl. ................... 95/90; 96/126; 96/131
(58) Field of Search ...................... 96/108, 111, 112, 96/121, 126, 127, 131, 132, 152, 372, 379; 95/90; 55/DIG. 30

(56) References Cited

U.S. PATENT DOCUMENTS

| | | | |
|---|---|---|---|
| 4,002,566 A | 1/1977 | Smith ........................... 210/169 |
| 4,076,615 A | 2/1978 | Olesen et al. | |
| 4,372,927 A | 2/1983 | McCullough | |
| 4,460,466 A | 7/1984 | Winter ........................ 210/274 |
| 4,764,355 A | 8/1988 | Romey et al. | |
| 4,980,138 A | 12/1990 | Samish | |
| 5,194,078 A * | 3/1993 | Yonemura et al. ............. 55/466 |
| 5,209,912 A | 5/1993 | Suchenwirth | |
| 5,505,892 A * | 4/1996 | Domme ........................ 210/490 |
| 5,512,088 A * | 4/1996 | McKenzie ..................... 55/518 |
| 5,618,730 A | 4/1997 | Eder et al. | |
| 5,635,394 A * | 6/1997 | Horn ............................ 435/266 |
| 5,679,252 A | 10/1997 | Gotou et al. ................. 210/614 |
| 5,837,136 A * | 11/1998 | Lee .............................. 106/488 |
| 5,895,520 A | 4/1999 | Rolke et al. ................... 95/132 |
| 5,972,211 A | 10/1999 | Jones ........................... 210/90 |
| 6,074,620 A | 6/2000 | Kienow et al. ......... 423/244.07 |
| 6,185,934 B1 | 2/2001 | Teboul .......................... 60/297 |
| 6,352,956 B1 * | 3/2002 | Kienow et al. .............. 106/464 |

FOREIGN PATENT DOCUMENTS

JP 8-112589 A * 5/1996
JP 08 126694 5/1996

* cited by examiner

Primary Examiner—David A. Simmons
Assistant Examiner—Frank M. Lawrence
(74) Attorney, Agent, or Firm—Collard & Roe, P.C.

(57) ABSTRACT

A device is disclosed for treating an exhaust gas emanating from a vehicle engine or a plant's chimney. This device has a housing having a treatment chamber defined therein, an inlet port for receiving an exhaust gas to be treated, and an outlet port for releasing a treated gas. The gas is allowed to flow in the treatment chamber from the inlet port to the outlet port defining a flowing direction. The device further has treating elements in the treatment chamber which are layers of rocks of granite alternating with layers of rocks of charcoal. The layers extend substantially in perpendicular to the flowing direction of the gas.

20 Claims, 3 Drawing Sheets

EXHAUST GAS TREATING DEVICE AND METHOD

FIELD OF THE INVENTION

The present invention relates generally to the art of exhaust gas filtration and more particularly to the cleaning of exhaust gases of an engine or a chimney.

BACKGROUND OF THE INVENTION

Pollution from the exhaust of vehicles or plant's chimneys has caused serious air quality problems. Moreover, it is a well known fact that such pollution is a major factor of the "greenhouse" effect. It is also a well known fact that vehicle and plant's chimneys exhaust are both major causes of poor air quality, especially in large and industrial countries.

Many of such countries have adopted environmental policies in order to improve the air quality. For instance, certain governments have strongly suggested the use of unleaded gasoline and firmly required the use of catalytic converters for vehicles. Furthermore, the governments have set up environmental protocols and restrictions to decrease air pollution emanating from plant's chimneys. However, these policies, protocols and restrictions have not completely resolved the air pollution problem.

Known in the art are devices for filtering exhaust gas emanating from an engine or chimneys of industrial plants that have been also used in order to improve the air quality. Examples of such prior art devices are described in U.S. Pat. Nos. 5,209,912; 6,074,620 and 6,185,934 B1. While these devices have resulted in the advancement within the present field, most of these prior art devices have not been successful or sufficiently efficient to filter the exhaust gases emanating from these sources.

Therefore, there is still a need for an improved device for filtering exhaust gases of an engine or a plant's chimney.

SUMMARY OF THE INVENTION

It is therefore an object of the present invention to provide an improved device for treating an exhaust gas.

In accordance with the invention, that object is achieved with a device for treating an exhaust gas, the device comprising:

- a housing having a treatment chamber defined therein, an inlet port for receiving an exhaust gas to be treated, and an outlet port for releasing a treated gas, the gas being allowed to flow in the treatment chamber from the inlet port to the outlet port defining a flowing direction; and
- treating means in said treatment chamber comprising layers of rocks of granite alternating with layers of rocks of charcoal, said layers extending substantially in perpendicular to the flowing direction of the gas.

The present invention is also directed to a combination of a first and a second device as defined above. The second device comprises regulating means for regulating the flow of gas in the housing of the second device and the combination further comprises connecting means for fluidly connecting the outlet port of the first device to the inlet port of the second device.

The present invention also proposes a method for treating an exhaust gas, comprising the steps of:

a) providing a device as defined above;
b) feeding the inlet port of the device with an exhaust gas;
c) treating the exhaust gas in the treatment chamber; and
d) releasing from the outlet port of the treatment chamber a treated gas.

A device for treating an exhaust gas according to the present invention proposes innovative features that makes it compact and easy-to manufacture and use. More importantly, the device of the present invention makes it possible to treat exhaust gas in a simple and efficient way. As a matter of fact, an important feature of the device resides in that layers of granite disposed between each layers of charcoal help reducing the temperature of the gas flowing in the treatment chamber. Such a reduction in the gas temperature will prevent the charcoal used to filter the exhaust gas from accelerated damage.

BRIEF DESCRIPTION OF THE DRAWINGS

The present invention and its advantages will be more easily understood after reading the following non-restrictive description of a preferred embodiment thereof, made with reference to the following drawings wherein.

DESCRIPTION OF PREFERRED EMBODIMENTS

The present invention is directed to a device for treating an exhaust gas. By "treating an exhaust gas" as that term is used therein, it is meant treating either through a chemical and/or a physical process. However, a particular advantageous treatment process in which the device of the present invention may find application is in the field of filtration of exhaust gas emanating from motorised vehicles, such as cars, motorcycle, trucks, snowmobiles, boats or the like. The device of the present invention may also be used for treating polluted air emanating from a chimney of an industrial plant.

Figure 1:
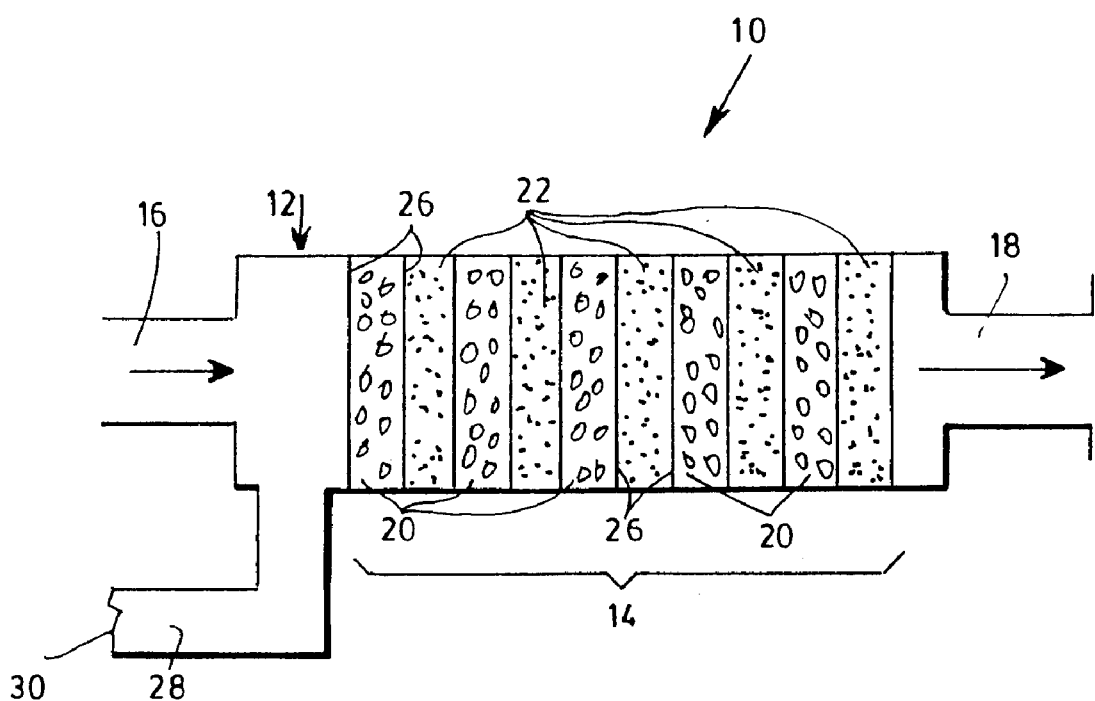
FIG. 1 is a schematic view of a device for treating an exhaust gas according to a preferred embodiment of the invention.

Referring to FIG. 1, the device (10) for treating an exhaust gas of the present invention comprises a housing (12) having a treatment chamber (14) defined therein. The housing (12) also comprises an inlet port (16) for receiving an exhaust gas to be treated, and an outlet port (18) for releasing a treated gas. The gas is allowed to flow in the treatment chamber (14) from the inlet port (16) to the outlet port (18) defining a flowing direction indicated with the arrows in FIG. 1. Furthermore, the device (10) of the present invention comprises treating means in the treatment chamber (14). Such treating means comprises layers of granite-containing material (20) alternating with layers of carbon-containing material (22). As it can be seen in FIGS. 2 and 3, the layers (20, 22) extend substantially in perpendicular to the flowing direction of the gas. In order to keep the layers (20, 22) substantially perpendicular to the flowing direction of the gas, it may be preferable, though not essential, to separate each layers (20, 22) with a mesh-like material (26). Preferably, the layers of granite-containing material (20) comprise rocks of granite, whereas the layers of carbon-containing material (22) may be charcoal or any other type of coal preferably made in the form of rocks.

In a situation where the device (10) of the present invention is used to treat exhaust gas emitted by a vehicle engine, the rocks of granite (20) have preferably a diameter of approximately ¾ inch and the rocks of charcoal (22) preferably have a diameter ranging approximately from ½ to 1 inch. Each layers of both granite (20) and charcoal (22) have preferably 6 ounces of material.

As can be appreciated, the important feature of the device (10) resides in that layers of rocks of granite (20) help reduce the temperature of the gas flowing in the treatment chamber (14). Such a reduction in the gas temperature prevents the rocks of charcoal (22) used to filter the exhaust gas from accelerated damage. Thus, by alternating layers of granite (20) and charcoal (22), it was surprisingly found that while the treatment of the exhaust gas was proceeding, the treating capacity of the rocks of charcoal (22) was maintained and prolonged over time.

According to a preferred embodiment, the housing (12) may comprise ventilating means for ventilating the treating chamber (14). Preferably, the ventilating means comprises an air conduit (28) in fluid communication with the treatment chamber (14). For instance, when the device (10) is used on a motorised vehicle, the device (10) is preferably installed at the back of the vehicle or more preferably the farthest from the engine so that the heat coming from the engine does not damage the device (10). On such situation, the flow of air is provided when the vehicle runs at high speed. Therefore, the air flow enters through the air conduit (28). Alternatively, in order to propel or inject the air through the air conduit (28), the latter (28) may have an air inlet (30) adapted to be fluidly connectable to a fan outlet (not shown). In this case, a 12 volt motor with a fan (similar to a car heater) is preferably used, but any other kind of air blower known to one skilled in the art may be used. The flow of air provided into the air conduit (28) is preferably controlled by a control means which may comprise a heat sensor linked to a fan controller in order to maintain the temperature inside the device (10) of approximately between 160° and 170° F. when the engine is running slowly or in the case that the outside temperature is substantially hot. In such a case, the heat sensor is preferably and operatively connected to the inlet port of the device (not shown). Preferably, the air blower starts when the temperature inside the device (10) is between 120° to 140° F.

Figure 2:
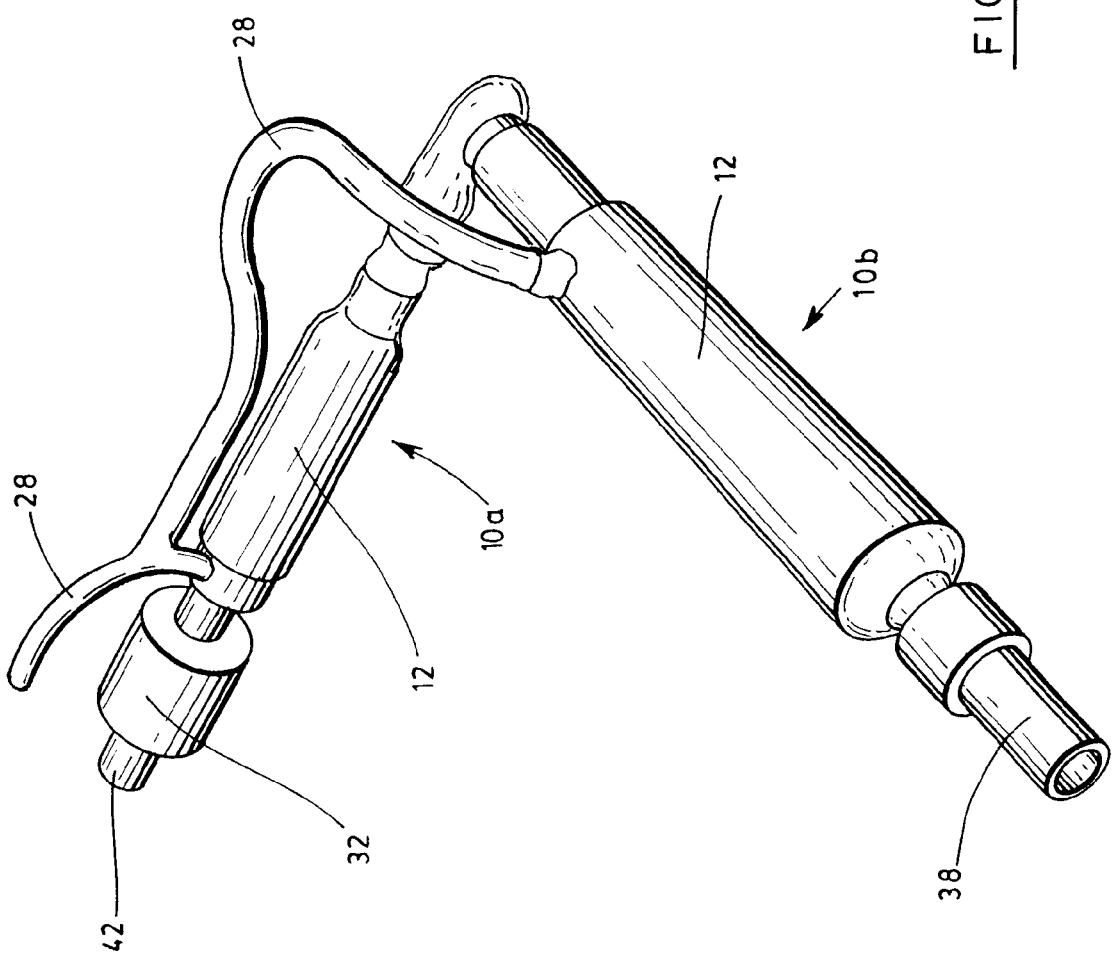
FIG. 2 is a perspective view of a device for treating an exhaust gas according to another preferred embodiment of the invention.
Figure 3:
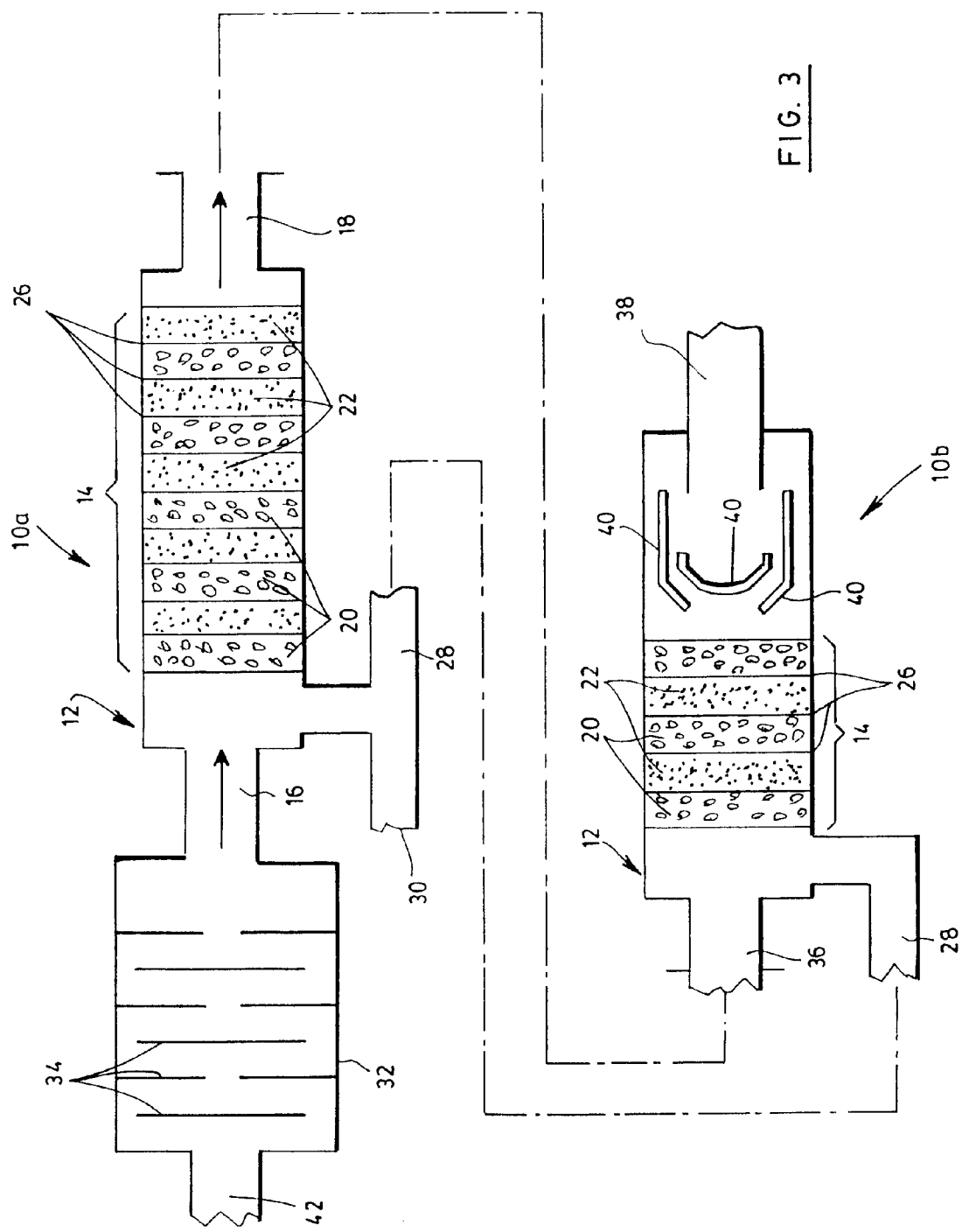
FIG. 3 is a schematic cross-sectional view of the device of FIG. 2.

Advantageously and as shown in FIGS. 2 and 3, the device (10) of the present invention may also comprise a reception chamber (32) upstream from the treatment chamber (14). As best viewed in FIG. 3, the reception chamber (32) is in fluid communication with the treatment chamber (14) and comprises regulating means for regulating the flow of exhaust gas before treatment in the treatment chamber (14). In such a case, the exhaust gas to be treated enters through the inlet (42) of the reception chamber (32). The regulating means comprises a plurality of baffle walls (34) disposed in a way to split the exhaust gas into flows of gases. Therefore, the gases are then forced to meet prior entering in the treatment chamber (14). Such a contact will result in a substantial decrease of the gas temperature. Moreover, the contact of these flows of gases will also get rid of some of the impurities contained in the exhaust gas. The reception chamber (32) may also have an indirect role of reducing or muffling the sound produced within the device (10) of the present invention.

Referring back to FIGS. 2 and 3, the present invention is also directed to a combination of a first (10a) and a second (10b) device as defined above. The combination further comprises connecting means for fluidly connecting the outlet port (18) of the first device (10a) to the inlet port (36) of the second device (10a). It will be understood that any type of connectors or fasteners known to one skilled in the art will suffice. It is preferable that the second device (10b) comprises regulating means for regulating the flow of gas in its treatment chamber (14). The regulating means of the second device (10b) are preferably downstream from the treatment chamber (14) and upstream from the outlet port (38) of the second device (10b). The regulating means of the second device (10b) comprises at least one baffle wall (40). These baffle walls (40), as seen in FIG. 3, are disposed in a way to force the contact of the gas before its release through the outlet (38) of the second device (10b). As mentioned above, the contact of the gases will get rid of the remaining impurities, if any, contained in the treated gas.

According to another aspect of the present invention, a method for treating an exhaust gas is proposed. The method comprises the steps of:

a) providing a device (10) as defined above;

b) feeding the inlet port (16) of the device (10) with an exhaust gas;

c) treating the exhaust gas in the treatment chamber (14); and d) releasing from the outlet port (18) of the treatment chamber (14) a treated gas.

The method may comprise the additional step of ventilating the treatment chamber (14). Advantageously, the method may also comprise prior to step b), a step of regulating the flow of exhaust gas.

According to a preferred embodiment, the method may further comprise after step d), the step of treating the gas released in step c), in another device (10b) as defined above. In such a situation, it may be preferable that the method comprise the step of regulating the flow of gas in the second device (10b).

EXAMPLE

It will be understood that the dimensions of a device (10) according to the present invention described hereinbelow are only given as an example when used to treat exhaust gas emitted by a vehicle engine. However, in order to increase or decrease the size of the device (in height, length, size), the same ratio referring to the dimensions of the parts is preferably kept.

| PARTS | DIMENSIONS |
|---|---|
| Reception chamber | 16" × 6" × 4" |
| Inlet and outlet of the reception chamber | 2¼" (diameter) |
| Treating chamber of the first housing: | |
| 5 layers of granite | Rocks of ¾" (diameter); a layer = 6 ounces of granite |
| 5 layers of charcoal | Rocks of 1" (diameter); a layer = 6 ounces of charcoal |
| Inlet and outlet of the first housing | 2¼" (diameter) |
| Treating chamber of the second housing: | |
| 2 layers of granite | Rocks of ¾" (diameter); a layer = 6 ounces of granite |
| 2 layers of charcoal | Rocks of ½" (diameter); first layer = 6 ounces of charcoal; second layer = 12 ounces of charcoal |
| Inlet and outlet of the second housing | 2¼" (diameter) |
| Air conduit | 1½" (diameter) |

It will be understood that the device (10) of the present invention may also be equipped with control means which will signal a malfunction of the device. For instance, the device may be equipped with an odour sensor operatively connected to its outlet port (18) in order to make sure that no bad odours are released in the environment. In a situation that the odour sensor has detected something, a signal will be sent to a controller and a warning light will be displayed, for instance, on the dashboard of the vehicle.

It will be also understood that the housing (12) of the device (10) may be mounted in such a way that the maintenance of the device is facilitated. For instance, the device may be so designed as to allow an easy access of the treatment chamber (14) in order to clean or change the rocks of granite (20) or charcoal (22).

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A device for treating an exhaust gas, the device comprising:
   a housing having a treatment chamber defined therein, an inlet port for receiving an exhaust gas to be treated, and an outlet port for releasing a treated gas, the gas being allowed to flow in the treatment chamber from the inlet port to the outlet port defining a flowing direction; and
   treating means in said treatment chamber comprising layers of rock of granite alternating with layers of rock of charcoal, said layers extending substantially in perpendicular to the flowing direction of the gas.

2. A device according to claim 1, wherein the rocks of granite have a diameter of approximately ¾ inch.

3. A device according to claim 1, wherein the rocks of charcoal have a diameter ranging approximately from ½ to 1 inch.

4. A device according to claim 1, wherein the housing comprises ventilating means for ventilating the treating chamber.

5. A device according to claim 4, wherein the ventilating means comprises an air conduit in fluid communication with the treatment chamber.

6. A device according to claim 5, wherein the air conduit has an air inlet adapted to be fluidly connectable to a fan outlet.

7. A device according to claim 1, comprising a reception chamber upstream from the treatment chamber, the reception chamber being in fluid communication with the treatment chamber.

8. A device according to claim 7, comprising a regulating means in the reception chamber for regulating the flow of exhaust gas before treatment in the treatment chamber.

9. A device according to claim 8, wherein the regulating means comprises a plurality of baffle walls.

10. A device according to claim 1, further comprising a heat sensor operatively connected to the inlet port.

11. A device according to claim 1, further comprising an odour sensor operatively connected to the outlet port.

12. A combination of a first and a second device as defined in claim 1, the second device comprising regulating means for regulating the flow of gas in the housing of the second device, and the combination further comprising connecting means for fluidly connecting the outlet port of the first device to the inlet port of the second device.

13. A combination according to claim 12, wherein the regulating means of the second device is downstream from the treatment chamber and upstream from the outlet port of the second device.

14. A combination according to claim 12, wherein the regulating means of the second device comprises at least one baffle wall.

15. A method of treating an exhaust gas, comprising the steps of:
   a) providing a device as defined in claim 1;
   b) feeding the inlet port of the device with an exhaust gas;
   c) treating the exhaust gas in the treatment chamber; and
   d) releasing from the outlet port of the treatment chamber a treated gas.

16. A method according to claim 15, comprising the additional step of ventilating the treatment chamber.

17. A method according to claim 15, comprising prior to step b), a step of regulating the flow of exhaust gas.

18. A method according to claim 15, comprising after step d), the step of:
   treating the gas released in step c), in another device as defined in claim 1.

19. A method according to claim 18, comprising the step of regulating the flow of gas in the second device.

20. A device for treating an exhaust gas, the device comprising:
   a reception chamber having an inlet for receiving an exhaust gas to be treated, an outlet and a plurality of baffle walls therein for regulating the flow of gas;
   a first housing having a treatment chamber defined therein, an inlet port in fluid communication with the outlet of the reception chamber, and an outlet port;
   a second housing downstream from the first housing, the second housing having a treatment chamber defined therein, an inlet port in fluid communication with the outlet of the first housing, an outlet port for releasing a treated gas, and at least one baffle wall for regulating the flow of gas after treatment in the treatment chamber of the second housing, the gas being allowed to flow in the treatment chambers from the inlet port of the first housing to the outlet port of the second housing defining a flowing direction;
   treating means in said treatment chambers comprising layers of rocks of granite alternating with layers of rocks of charcoal, said layers extending substantially in perpendicular to the flowing direction of the gas; and
   ventilating means for ventilating the treatment chambers comprising an air conduit in fluid communication with the treatment chambers.

* * * * *